(12) United States Patent
Kristjansson (10) Patent No.: US 9,175,865 B2
(45) Date of Patent: Nov. 3, 2015

(54) HEAT STORAGE SYSTEM

(75) Inventor: Halldor Kristjansson, Koebenhavn N (DK)

(73) Assignee: Danfoss A/S, Nordborg (DK)

( * ) Notice: Subject to any disclaimer, the term of this patent is extended or adjusted under 35 U.S.C. 154(b) by 47 days.

(21) Appl. No.: 13/391,889

(22) PCT Filed: Aug. 24, 2010

(86) PCT No.: PCT/DK2010/000119
§ 371 (c)(1),
(2), (4) Date: Jul. 19, 2012

(87) PCT Pub. No.: WO2011/023193
PCT Pub. Date: Mar. 3, 2011

(65) Prior Publication Data
US 2012/0272948 A1    Nov. 1, 2012

(30) Foreign Application Priority Data

Aug. 25, 2009  (DK) .......................... PA 2009 00957

(51) Int. Cl.
| | |
|---|---|
| *F28D 15/00* | (2006.01) |
| *F24J 2/04* | (2006.01) |
| *F24D 17/02* | (2006.01) |
| *F24D 11/02* | (2006.01) |
| *F24D 19/10* | (2006.01) |

(52) U.S. Cl.
CPC ............ *F24D 17/02* (2013.01); *F24D 11/0221* (2013.01); *F24D 11/0228* (2013.01); *F24D 19/1078* (2013.01); *Y02B 10/20* (2013.01); *Y02B 10/40* (2013.01); *Y02B 10/70* (2013.01); *Y02B 30/126* (2013.01)

(58) Field of Classification Search
CPC . Y02E 60/142; Y02E 60/145; F28D 20/0039; F24D 11/0228; F24D 11/0221; F24D 17/02; F24D 19/1078; Y02B 10/70; Y02B 30/126; Y02B 30/12
USPC .............................. 126/617, 614, 634; 165/10
See application file for complete search history.

(56) References Cited

U.S. PATENT DOCUMENTS

| | | | | |
|---|---|---|---|---|
| 3,976,584 A | * | 8/1976 | Leifer | 252/77 |
| 3,996,759 A | * | 12/1976 | Meckler | 62/170 |
| 4,143,642 A | * | 3/1979 | Beaulieu | 126/585 |
| 4,146,087 A | * | 3/1979 | Johansson | 165/132 |
| 4,173,125 A | * | 11/1979 | Bradshaw | 62/79 |

(Continued)

FOREIGN PATENT DOCUMENTS

| | | |
|---|---|---|
| CN | 1366161 A | 8/2002 |
| CN | 1517604 A | 8/2004 |

(Continued)

*Primary Examiner* — Avinash Savani
*Assistant Examiner* — Deepak Deean
(74) *Attorney, Agent, or Firm* — McCormick, Paulding & Huber LLP (57) ABSTRACT

The invention relates to a thermal energy storage system comprising at least one thermal reservoir and at least one thermal energy transfer means that, at least at times, are able to transfer thermal energy from at least one first section of the thermal reservoir to at least one second section of the thermal reservoir. The invention also relates to a method changing the energy distribution of a thermal reservoir wherein thermal energy is transferred from at least one first section of the thermal reservoir to at least one second section of the thermal reservoir.

15 Claims, 3 Drawing Sheets

(56) References Cited

U.S. PATENT DOCUMENTS

| | | | |
|---|---|---|---|
| 4,527,618 A * | 7/1985 | Fyfe et al. | 126/635 |
| 4,537,348 A * | 8/1985 | Gossi | 237/8 A |
| 6,907,923 B2 * | 6/2005 | Sienel | 165/236 |
| 7,085,483 B2 * | 8/2006 | Terashima et al. | 392/485 |
| 7,441,558 B2 * | 10/2008 | Leifer et al. | 126/617 |
| 7,458,418 B2 * | 12/2008 | Sienel | 165/236 |
| 7,503,185 B2 * | 3/2009 | Narayanamurthy et al. | 62/332 |
| 7,958,885 B2 * | 6/2011 | Leifer et al. | 126/400 |
| 8,549,868 B2 * | 10/2013 | Komori et al. | 62/238.7 |
| 2008/0092875 A1 * | 4/2008 | Leifer et al. | 126/617 |
| 2008/0211230 A1 * | 9/2008 | Gurin | 290/2 |
| 2009/0007900 A1 * | 1/2009 | Leifer et al. | 126/400 |
| 2009/0173336 A1 * | 7/2009 | Leifer et al. | 126/617 |
| 2009/0183518 A1 * | 7/2009 | Narayanamurthy et al. | 62/119 |
| 2010/0038441 A1 * | 2/2010 | Pedersen | 237/2 B |
| 2010/0230071 A1 * | 9/2010 | Slater | 165/45 |

FOREIGN PATENT DOCUMENTS

| | | |
|---|---|---|
| CN | 101231003 A | 7/2008 |
| EP | 0134184 A2 | 3/1985 |
| JP | 2004225926 A | 8/2004 |
| JP | 2004245506 A | 9/2004 |
| JP | 2007046858 A | 2/2007 |
| JP | 2009052865 A | 3/2009 |
| WO | 2008027041 A1 | 3/2008 |
| WO | WO 2009001535 A1 * | 12/2008 |

* cited by examiner

HEAT STORAGE SYSTEM

CROSS REFERENCE TO RELATED APPLICATIONS

This application is entitled to the benefit of and incorporates by reference essential subject matter disclosed in International Patent Application No. PCT/DK2010/000119 filed on Aug. 24, 2010 and Danish Patent Application No. PA 2009 00957 filed Aug. 25, 2009.

FIELD OF THE INVENTION

The invention relates to a thermal energy storage system comprising at least one thermal reservoir and at least one thermal energy transfer means that at least at times are able to transfer thermal energy from at least one first section of the thermal reservoir to at least one second section of the thermal reservoir.

BACKGROUND OF THE INVENTION

A thermal energy storage system can be used to store thermal energy in a thermal reservoir. Storing thermal energy in a thermal reservoir is well known. There are a multitude of reasons for storing energy in a thermal reservoir, among them: If it is desired to be able to reliably draw thermal energy of a level or amount, it is normally easier and less energy consuming to store the thermal energy.

A reason for using a thermal energy storage system is that it is not always possible to control the production of thermal energy. This could be the case if the system is connected to an unreliable source, for example, a solar collector. If the sun is shining it can provide thermal energy in the form of hot fluid, but during night it cannot provide thermal energy. Storing the thermal energy makes it possible to have thermal energy available during the night.

Another reason could be that there is a need to draw a lot of thermal energy over a short period of time which is normally not possible for the thermal energy supply system to provide. A thermal energy storage system can then provide the required additional thermal energy.

Yet another reason for using a thermal energy storage system is that it is easier to control and optimize if a steady and reliable supply of thermal energy is required.

Thermal energy storage systems are, for example, used in heating systems of buildings and houses, where they supply hot fluid to radiators and other heaters to heat the building or house and supply hot tap water.

It is well known in the art to use water containers to store hot water for heating up a house and provide hot tap water. Water stratification occurs when cold and warm fluid form layers that act as barriers to water mixing because the density changes as the temperature changes. Normally it is preferred that the water container is hot in the upper part and cold in the bottom part, which will occur by natural conduction and/or natural circulation of the water in the container. Hence the thermal energy distribution in the container can be changed and thus be optimised. It is also known to have different kinds of inserted devices in the container that passively enhance the stratification process of the container. This could be plates or segments that act as separators and enhancers for the stratification process.

SUMMARY OF THE INVENTION

Therefore, the object of the invention is to provide an improved heat storage system.

It is therefore suggested to design the previously mentioned heat storage system so that at least one of said thermal energy transfer means is designed as an active thermal energy transfer means. By using active thermal energy transfer means it is possible to move energy from a part of the thermal reservoir that has a lower energy level to a part that has a higher energy level. The second law of thermodynamics requires work to be done if energy should be moved this way. Thus it also forbids the passive transfer of energy from a lower level to a higher level. In the process of actively transferring thermal energy it is necessary to apply work; this work will usually, at least partly, be introduced as thermal energy into the thermal reservoir. By transferring the thermal energy from one part to another of a thermal reservoir, it is possible to have one part at a relatively high energy level where another part has a relatively low energy level. This can be an advantage if one desires to draw energy above a certain level from the thermal reservoir and the reservoir does not have an average energy level above the required. It is then possible to draw energy from the part that has a high level.

For example, if one wishes to draw water of 60' C from a storage tank and the storage tank is filled with water that is only 40' C, the solution known in the prior art would suggest to heat the water in the storage tank until at least a part of the tank reaches 60' C and then draw the 60' C water; instead of only adding thermal energy to the system, the present invention would move heat from one part of the storage tank to another, causing one part to get colder and one part to get hotter. When the hot part reaches 60' C it is possible to draw water at the required temperature. Of course it is not possible to draw as much hot water from the storage tank as from the system where you simply heat the system, but that is because, contrary to prior art, thermal energy is not added to the system in any significant amount. When referring to thermal energy level it should be understood as temperature level which in the simple case could be interpreted simply as the temperature.

When using thermal energy it is normal to consider the price and the amount of pollution is involved in the production of the thermal energy. Further it is important that the thermal energy has the required level of energy (eg. that the temperature is high enough). Sometimes it is possible to get thermal energy very cheap (or free), or thermal energy that pollutes very little (or not at all), but the energy level is not high enough. Then the present invention can be very energy efficient by accumulating the energy in one part of the thermal reservoir then making sure that there is usable thermal energy available. As an example, if one has a storage tank that is heated with a solar collector, the solar collector provides free and non-polluting energy, but sometimes during a cloudy day it is not possible to heat the water sufficiently. By using the present invention it is possible to make part of the storage tank sufficiently hot. This is done by cooling another part of the storage tank which can then be heated by the solar collector. Overall this will give the cheapest and least polluting supply of hot water.

Preferably, the first section and the second section of the thermal reservoir are positioned distant from each other, preferably opposite to each other. When the sections are distant to each other it enhances the stratifying process of storage tank. Between the two, there could be some additional sections that could at least partly be used as barriers between the first and the second sections. An example could be a storage tank with water where energy is transported from the bottom to the top, this stratifies the storage tank.

The thermal energy storage system could also comprise at least one additional thermal energy source that is able to at least at times add thermal energy to the thermal reservoir. The system could then be used for heating buildings or houses over a longer period of time. When heating buildings, it is necessary to have a source of thermal energy, as a system where essentially no thermal energy is added has a limit as to how much energy can be drawn and in principle, over time there is no limit to how much thermal energy buildings or houses can use.

Preferably at least one of said additional thermal energy sources is taken from the group, consisting of solar collectors, thermal solar collectors, distributed heating networks, fuel heaters, aerial heat pumps, groundwater heat pumps, geothermal heat pumps, fuel cells and electric heaters. These are all well known thermal energy sources and are fairly affordably and can reliably provide thermal energy. It could be an idea to add more than one thermal energy source of different design, as this will lower the probability of malfunction of the system. Further one could economically optimise the thermal energy production. As an example, if there is both an electric heater and a fuel heater present and the price of electricity and fuel varies from time to time one could minimise the costs of producing thermal energy by using the most cost efficient heater at a specific time.

At least one of said active thermal energy transfer means could comprise a unit, taken from the group consisting of Peltier-elements and heat pumps. They are commercially available in different types and sizes. The specific use of the system would determine which active thermal energy transfer means to use.

Preferably, the thermal reservoir comprises a fluid, preferably a watery fluid. Storing thermal energy in a fluid is an advantage, because it is easy to both draw and feed the energy to and from a fluid and thus the thermal reservoir. Fluid that as a majority consists of water has the advantage that water has some very good thermodynamic properties for storing thermal energy. The specific heat capacity is very high and it is available almost everywhere and is relatively harmless in the case of a leak in the system.

The active thermal energy transfer means could preferably comprise a first part and a second part, where the active thermal energy transfer means is able to transfer thermal energy from the first part to the second part, wherein the first part is, at least at times, able to draw fluid from the thermal reservoir via a first supply line and/or the second part is, at least at times, able to draw fluid from the thermal reservoir via a second supply line. It should be understood that the first and second supply lines can at least in part deformed by only one single supply line. This single supply line then at least for some length contributes to the supply of fluid to the first and the second part. By drawing fluid from the thermal reservoir and let the active thermal energy transfer means transfer thermal energy between one part of drawn fluid to another part of the drawn fluid. The thermal energy in one part is then transferred to the other part. One can then optimise use of the work done by the active thermal energy transfer means.

Preferably the first part and/or the second part are further, at least at times able to supply fluid to the fluid thermal reservoir having a different temperature level than the average temperature level in the thermal reservoir, preferably a higher and/or lower temperature level than the average temperature level in the thermal reservoir. By constructing the thermal storage system this way one can minimize the work that needs to be done by the active thermal energy transfer means to get a section of the thermal reservoir that has a sufficiently high temperature.

The invention also relates to a heating system for providing thermal energy supply to a building that preferably comprises a heat storage system as described herein. By incorporating the heat storage system into a heating system one can use the advantages of the heat storage system as described herein.

The invention also relates to a method for changing the energy distribution of a thermal reservoir wherein thermal energy is transferred from at least one first section of the thermal reservoir to at least one second section of the thermal reservoir. As previously described there are several reasons for wishing to store thermal energy in a thermal reservoir. It is suggested that the method is characterised in that the transfer of thermal energy is, at least in part and/or at times, performed by an active thermal energy transfer means. By using active thermal energy transfer means it is possible to move energy from a part of the thermal reservoir that has a lower energy level to a part that has a higher energy level.

Preferably, at least in part and/or at least at times, a thermal energy transfer is performed by fluid flow between at least one third section of the thermal reservoir and at least one of the first sections of the thermal reservoir and/or at least one of the second sections of the thermal reservoir. Drawing fluid from a third section and using the active thermal energy transfer means to heat and cool the fluid and at least in part return the fluid to either the first section and/or the second section causes that the active thermal energy transfer means can be operated in an efficient mode where the work done by the active thermal energy transfer means can be minimised in relation to the transfer of the thermal energy.

Preferably, at least at times, essentially no thermal energy is added and/or removed to/from the thermal reservoir. It is to be understood that having to apply work if one actively transfers thermal energy causes that it cannot be prevented that at least part of this work is introduced in the transfer as thermal energy.

BRIEF DESCRIPTION OF THE DRAWINGS

In the following, the invention is explained in detail on the basis of the figures showing.

DETAILED DESCRIPTION OF THE PREFERRED EMBODIMENTS

To simplify the further discussion, all figures show temperature values. The values given are only examples of possible temperatures and/or temperature ranges, and are not intended to limit the invention in any way.

Figure 1:
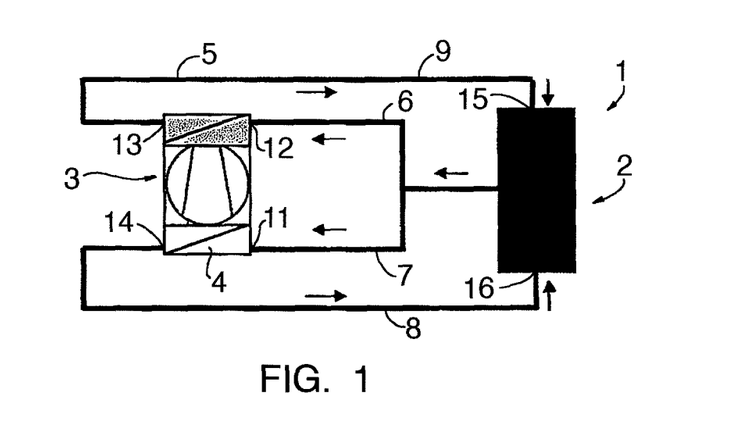
FIG. 1 is a first possible embodiment of a thermal energy storage system in a schematic view.

FIG. 1 shows a first possible embodiment of a heat storage system 1. The heat pump 3 is shown in schematic view, hence only a schematic of the circuit, the low-temperature part 4 and the high-temperature part 5 are shown. For a more detailed description of a heat pump 3, see FIG. 3, and description below. In short the heat pump 3 is able to transport heat from the low-temperature part 4 to the high-temperature part 5. FIG. 1 also shows a storage tank 2. The storage tank 2 is filled with a fluid. The fluid could be water or water with additives where the additives could have the properties of inhibiting bacterial growth in the water and/or the corrosive effect of water on the system and/or in other way preventing the water to change its physical and chemical properties. In the following the word water is used for the fluid in the system even though it might be any fluid with or without additives.

The storage tank 2 has good insulation properties as the water inside the storage tank 2 will most likely have a higher temperature than the surroundings. Even though the tank 2 is insulated the temperature of the water will slowly go towards the outer temperature if the water is not heated in any way.

Further the storage tank 2 has a storage tank outlet 10 which is situated approximately in the middle of the storage tank 2. Here water follows the supply line and is split up in two supply lines 6, 7 and guided via the high-temperature part supply line 6 to the high-temperature part inlet 12 and via the low-temperature part supply line 7 to the low-temperature part inlet 11. The water that passes through the high-temperature part 5 is heated and exits the high-temperature part 5 through the high-temperature part outlet 13. The hot water is then lead through the high-temperature part return line 9 to the storage tank top opening 15. The water that is cooled down in the low-temperature part 4 exits the low-temperature part 4 though the low-temperature part outlet 14 and is led through the low-temperature part return line 8 to the storage tank bottom opening 16 through which it enters the storage tank.

Figure 2:
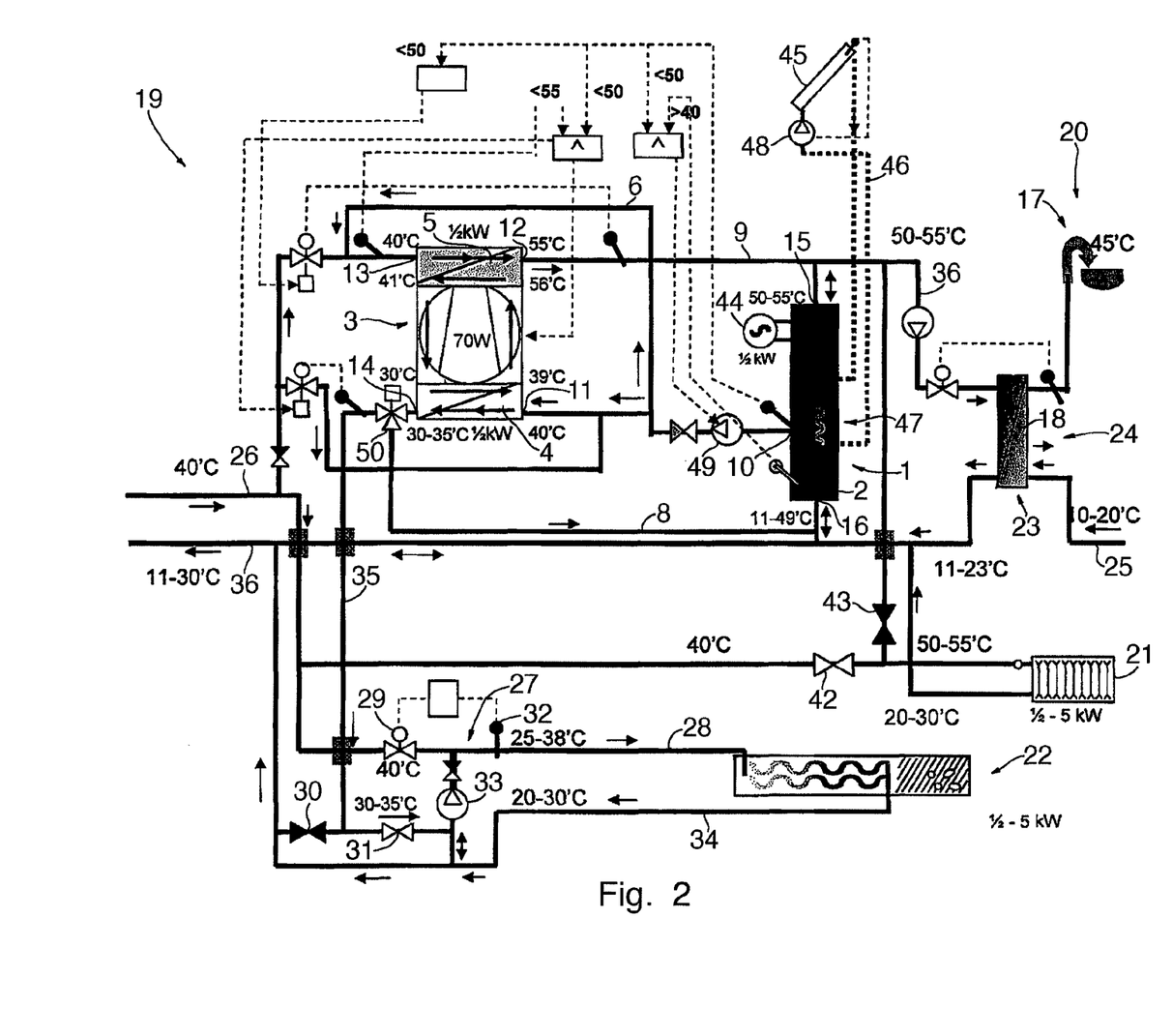
FIG. 2 is a part of a second possible embodiment of a thermal energy storage system in a schematic view.

If one wants to draw domestic hot water from a storage tank 2, the normal requirement is at least 45' C for tap water. As there is some heat loss of the water from the storage tank 2 to the tap 17, it is preferred that the water temperature in the storage tank 2 is at least 50' C (see also FIG. 2). The water can either go directly to the tap 17 where the water that flows out of the tap 17 and the water that is stored in the storage tank 2 is the same or it could go through a heat exchanger 18 where some fresh water is heated and used as tap water 17. This is shown in FIG. 2 as described below. As seen in FIG. 2 the water can be drawn from the top 15 of the storage tank 2. This is the conventional way of drawing hot water from a storage tank 2.

If, for example, the water temperature out through the storage tank 2 is 40' C, the temperature is too low to be used for tap water 17. The heat storage system 1 can be used to stratify the storage tank 2 and make the water temperature in the top 60' C and the bottom 20' C. This is done in the following way: water is drawn in the middle of the storage tank 2 where the temperature will stay very close to 40' C, the water is split up and fed to both sides 4, 5 of the heat pump 3 where the one side 4 is cooled and the other 5 is heated. Then the hot water is returned to the top 15 of the storage tank 2 and the cold water is returned to the bottom 16 of the storage tank 2. If this is continued for some time the storage tank 2 gets highly stratified with a layer of 60' C water in the upper half and a layer of 20' C of water in the lower half of the storage tank 2. At this point it is possible to draw usable water from the top of the storage tank 2. In practice there will from time to time be some middle layer with an intermediate temperature of approximately 40' C. The properties such as the temperature and size of the layers changes over time both due to natural circulation and due to outer influence of the tank such as drawing and adding water or heating or cooling of to the water in the storage tank 2. For example, when water is drawn from the storage tank 2 the size and temperature of the layers changes.

This is made possible by moving heat from the bottom of the storage tank 2 to the top. Hence the overall thermal energy in the storage tank 2 is conserved. The heat pump 3 that performs the heat transfer requires work to move the thermal energy from the low-temperature part 4 to the high-temperature part 5. This mechanical work is at least partly used to heat the water in the high-temperature part 5 hence it is (at least partly) introduced as thermal energy into the storage tank 2.

In FIG. 2, a first possible embodiment of a heating system 19, using a heat storage system 1, is depicted. The heating system 19 is supplied with hot water 26 from a district heating system but the supply of hot water 26 could be made from any source, for example: oil/gas burner, electric heater, solar collector or a heat pump.

The heating system supplies the building 20 with thermal energy in several ways:

Firstly, the heating system 19 supplies heat for heating the rooms within the building 20. To do this, two different heating systems 21, 22 are provided in the example shown in FIG. 2. Firstly, heating radiators 21 (wherein in FIG. 2 only one heating radiator is shown) are supplied with thermal energy. Secondly, a floor heating system 22 is also served by the heating system 19. Both heating radiators 21 and a floor heating system 22 can be arranged in a single room. Usually, however, certain rooms will be provided with heating radiators 21, while other rooms will be provided with a floor heating system 22.

Secondly, the heating system 19 provides thermal energy for a hot water supply system 23. The hot water supply system 23 is used for providing hot tap water 17, which is used for different purposes, like for showering, bathing, hand washing, dishwashers, washing machines or the like. In the embodiment shown, the hot water supply system 23 comprises the heat storage system 1 and a fresh water part 24. The two parts are thermally coupled by means of a heat exchanger 18. While this type of design shows some thermal losses due to the heat exchanger 18 involved, it has considerable hygienic advantages. This is particularly important, if the hot tap water 17 will be used for showering, drinking, tooth brushing or the like. Due to the separate fresh water part 24, cold tap water 25 will be heated up in the heat exchanger 18 and will be dispensed immediately afterwards through a water tap 17. One could also use the water in the storage tank 2 directly as hot tap water 17, but then one has to consider hygienic problems such as legionella in the water.

The heating system shown in FIG. 2 is preferable if the water temperature is below the normal district heating water temperature of at least 60' C. Here the water temperature is set to 40' C as an example. Due to this rather low temperature in the forward line 26, all heating services 17, 21 can no longer be provided for by the water coming directly out of the forward line 26.

In the presently depicted example, a floor heating system 22 can still be directly operated with water coming from forward line 26 at a temperature of 40° C. On the contrary, with floor heating systems 22, even a temperature of 40° C. can prove to be too high. Therefore, a fluid mixing loop 27 is provided for conditioning the water, going via feeding line 28 to the floor heating system 22. The water mixing loop 27 as such is well known in the state of the art. In principle, several valves 29, 30, 31, a temperature sensor 32 and a pump 33 are provided, to mix warmer and colder water in a way that the temperature of the water entering the floor heating system 22 through feed line 28 has an acceptable temperature level.

However, in the example of FIG. 2, not only water coming back from the floor heating system 22 through the return line 34 (therefore being at a lower temperature) is mixed with hot water coming from district heating forward line 26, but also water coming from an interconnecting line 35 is used for mixing. The temperature in the interconnection line 35 is normally between the (somewhat higher) temperature in the district heating net forward line 26, and the (somewhat lower) return temperature from the floor heating 22. The placement of the joint of the interconnection line 35 with the mixing loop secures that the medium temperature water from the interconnection line 35 has higher priority than the water from return line 34. Thus water flow from the district heating net forward line 28 is saved, and the temperature of return line 36 is lowered. The interconnecting line 35 is connected to the low-temperature part 4 of heat pump 3. This will be described in more detail later.

Other services of the heating system 19, however, have to be supplied at a higher temperature level. Such services can be, for example, standard heat radiators 21 and/or a hot water supply system 23 for the supply of hot tap water 17. The temperature level varies and especially in cold weather there is a demand for higher temperature to radiators 21 where as in relatively warm weather the temperature in the radiators 21 can be as low as 40° C. To be effective, such systems usually need a feed line 36 temperature level of at least some 50° C. to 55° C. (or higher). Otherwise, the hot tap water 17 coming out of a water tap 17 would be too cold.

This is actually the reason, why district heating systems according to the state of the art do require a supply temperature level of some 60° C. or higher. Another reason for the high temperature is that high temperatures reduce biological pollution problems like bacteria (for example legionella).

The heat pump 3 is used in two different modes of operation, firstly in the previously described mode where the thermal energy in the heat storage system 1 can be moved from the bottom of the storage tank 2 to the top of the storage tank 2. This will also get elaborated in more detail below. Secondly another mode will be presented where the heat pump 3 is using the district heating water to thermally charge the storage tank 2. In the presently shown heating system 19, low-temperature at the forward line 26 is not problematic anymore. This is because of the heat pump 3 in the heating system 1. The heat pump 3 comprises and connects a low-temperature part 4 and a high-temperature part 5 (see also FIG. 3). The low-temperature part 4 of the heat pump 3 is supplied with thermal energy, coming from the district heating net forward line 28 (or as described earlier from the storage tank 2 through the low-temperature part supply line 7). The thermal energy of the heating fluid is transferred to an evaporator part 37 of the refrigerant circuit 41 of the heat pump 3 (compare with FIG. 3). In the evaporator part 37 of the heat pump 3, heat is absorbed by the evaporating refrigerant. The refrigerant is compressed by the compressor 40 and transferred to a condenser part 38 of the refrigerant circuit 41. In the condenser part 38 of the heat pump 3, heat is transferred through a heat exchanger to another fraction of the water, coming from the district heating net 26 through forward line 28 (or as described earlier from the storage tank 2 through the high-temperature part supply line 6). There, the relatively low temperature of 40° C. is raised to a usable temperature level of around 50° to 55° C. This constitutes the high-temperature part 5 of the heat pump 3.

Figure 3:
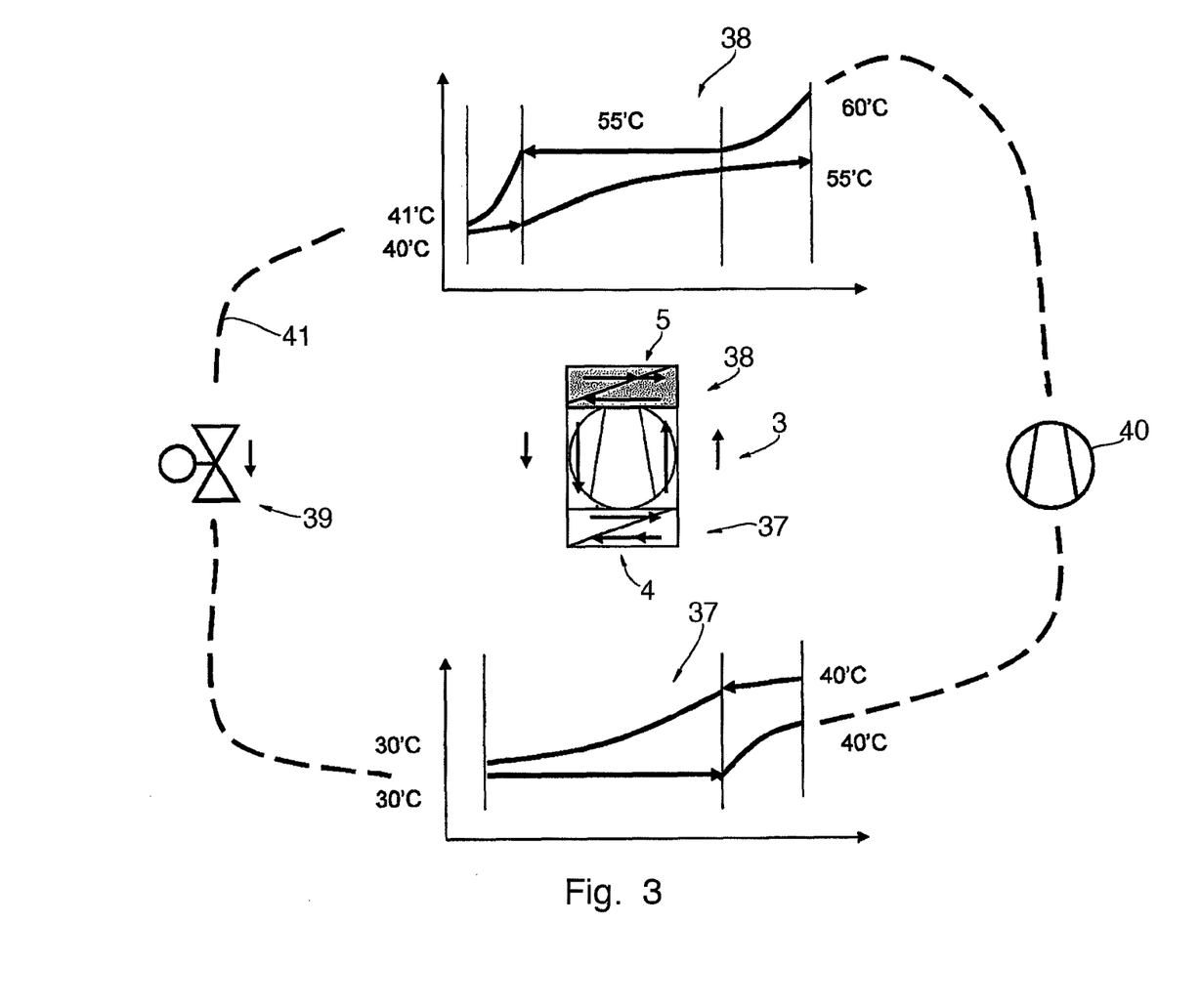
FIG. 3 is a possible embodiment of a heat pump in a schematic view.

From the high-temperature part 5 of the heat pump 3, the refrigerant is led through a throttle valve 39 and to the evaporator part 37. The pressure decreases in throttle valve 39, causing the temperature of the refrigerant to drop, so that the refrigerant can absorb thermal energy from the water, flowing through the low-temperature part 4. Since the temperature of the water, exiting the low-temperature part 4 through interconnecting line 35 is lowered by the work of the heat pump 3, the water can be led back to the bottom of the tank 2. Alternatively the water can be directly in full or partially returned to the return line 36 leading back to the district heating net by opening valve 30 and closing valve 31 or be used in the fluid mixing loop 27 of the floor heating system 22.

The water exiting the high-temperature part 5 of the heat pump 3 through the high-temperature return line 9 can be used for heating up the upper part of the heat storage tank 2 of the heat storage system 1 and/or for supplying thermal consumers like a hot water supply system 23 or heating radiators 21.

The radiators 21 can also be supplied from the forward line 26. This is con-trolled by the valves 42 and 43. Some radiators can operate with 40' C for most of the year. Only when the heat demand is high during winter, it is necessary to supply higher water temperatures to the radiators 21.

Is to be noted that the main thermal consumer of the heating system 19 is the floor heating system 22. Services, which need a high input temperature (like the hot water supply system 23), on the other hand, are usually using an small part of the overall thermal load. This is because they are usually used only from time to time. Therefore, the heat pump 3 can usually be designed with a relatively low heat transfer capability. Further, when the heat pump 3 is used to move thermal energy within the heat storage system 1 and/or to stratify the storage tank 2, the work that the heat pump 3 must provide is relatively small. In the example, shown in FIG. 2, the electrical power of the heat pump 3 is around 70 W. This transfers into a heat transfer capability of around 0.5 kW. As can be seen by the numbers, a compressor 28 of the size of a standard compressor for refrigerators can be used for this. In case the power of the heat pump 3 is exceeded, additional heaters 44, 45 can compensate for the missing heating power, for example.

It should be mentioned that supplying heat radiators 21 with the high-temperature water, heated by means of a heat pump 3 is energetically inferior to supplying a floor heating system 22 with lower temperature water. Sometimes, however, heating radiators 21 might not be avoidable. When refurbishing a house, for example, it might not be possible to install a floor heating system 22 in all rooms of the existing building.

Of course, the described heating system 19 can also be advantageously employed, when the forward temperature of the district heating net is so high that it is not needed to operate the heat pump 3, for heating of district heating water 26. In this case, the heat pump 3 can be switched off, so that the water coming from the district heating through forward line 26 is in some sense thermally connected directly to the heat storage tank 2 and/or the heating radiators 21. The heating system 19 described herein could be used as a fallback position, for example when the district heating system is operated at a low temperature due to expensive fuel such as oil or gas. Then the heat pump 3 would only be used to stratify the storage tank 2.

The heating system 19 could also be equipped with several additional heaters. In the example shown in FIG. 2, an electric heater 44 and a solar collector 45 are shown. The electric heater 44 is only used when all the other systems are not able to provide a sufficiently high temperature in the storage tank 2. The solar collector 45 shown is the conventional type where a watery fluid is driven by a pump 48 through a fluid loop 46 where it gets heated in the solar collector 45 and circulated to a heat exchange region 47 within the storage tank 2, where it heats the water inside the storage tank 2. The heat exchanging region 47 could be made as a copper pipe within the storage tank 2. A solar collector 45 provides very cheap heating of the water in the storage tank 2. The problem with solar collectors 45 is that they cannot always provide a temperature above the required 50' C. The advantage is that the heating from a solar collector 45 is very cheap.

One could be in a position where the solar collectors 45 can heat the water in the storage tank 2 to a temperature that is below the usable temperature. When this happens, the pump 49 is turned on and water is drawn from the storage tank 2 through the supply line that is split up into the high-temperature part 5 and the low-temperature part 4 supply line 6, 7. The heat pump 3 is now used in the mode where it heats water from the storage tank 2 by using the heat from the water from the storage tank 2. The hot water from the high-temperature part 5 is then returned to the top of the storage tank 2. The cold water from the low-temperature part 4 is returned to the bottom of the storage tank 2 by switching the three-way valve 50. In this mode of operation it is possible to take greater advantage of the very cheap heating that the solar collector 45 provides. And the energy required to move the heat from the bottom 11 of the tank 2 to the top 15 is considerably lower than simply heating the tank 2 even if only the top 15 of the tank 2 is heated.

Although the invention above has been described in connection with preferred embodiments of the invention, it will be evident for a person skilled in the art that several modifications are conceivable without departing from the invention as defined by the following claims.

What is claimed is:

1. A thermal energy storage system comprising:
    at least one thermal reservoir; and
    at least one active thermal energy transfer means that, at least at times, transfers thermal energy from at least one low-temperature section of the thermal reservoir to at least one high-temperature section of the thermal reservoir;
    wherein the at least one thermal reservoir comprises an outlet at a middle portion of the at least one thermal reservoir between the at least one low-temperature section and the at least one high-temperature section, the outlet of the at least one thermal reservoir splitting into a high-temperature supply line directly supplying fluid from the outlet of the at least one thermal reservoir to a high-temperature part of the at least one active thermal energy transfer means and a low-temperature supply line directly supplying fluid from the outlet of the at least one thermal reservoir to a low-temperature part of the at least one active thermal energy transfer means;
    wherein the low-temperature part of the at least one active thermal energy transfer means is fluidly connected to a low-temperature part return line connected to the at least one low-temperature section of the thermal reservoir and pumps fluid from the outlet of the at least one thermal reservoir to the at least one low-temperature section of the thermal reservoir;
    wherein the high-temperature part of the at least one active thermal energy transfer means is fluidly connected to a high-temperature part return line connected to the at least one high-temperature section of the thermal reservoir and pumps fluid from the outlet of the at least one thermal reservoir to the at least one high-temperature section of the thermal reservoir; and
    wherein the at least one active thermal energy transfer means transports heat from fluid from the low temperature supply line to fluid from the high temperature supply line so that the low-temperature part of the at least one active thermal energy transfer means pumps cooled fluid to the at least one low-temperature section of the thermal reservoir, and the high-temperature part of the at least one active thermal energy transfer means pumps heated fluid to the at least one high-temperature section of the thermal reservoir.

2. The thermal energy storage system as claimed in claim 1, wherein the low-temperature section and the high-temperature section of the at least one thermal reservoir are positioned distant from each other.

3. The thermal energy storage system as claimed in claim 1, further comprising at least one thermal energy source that, at least at times, adds thermal energy to the at least one thermal reservoir.

4. The thermal energy storage system as claimed in claim 3, wherein the at least one thermal energy source is selected from the group consisting of solar collectors, thermal solar collectors, distributed heating networks, fuel heaters, aerial heat pumps, groundwater heat pumps, geothermal heat pumps, fuel cells and electric heaters.

5. The thermal energy storage system as claimed in claim 1, wherein the at least one active thermal energy transfer means comprises a unit selected from the group consisting of Peltier-elements and heat pumps.

6. The thermal energy storage system as claimed in claim 1, wherein the at least one thermal reservoir comprises a fluid.

7. The thermal energy storage system as claimed in claim 5,
    wherein the active thermal energy transfer means comprises the low-temperature part and the high-temperature part,
    wherein the active thermal energy transfer means transfers thermal energy from the low-temperature part to the high-temperature part,
    wherein the low-temperature part, at least at times, draws fluid from the at least one thermal reservoir via the low-temperature supply line and/or the high-temperature part, at least at times, draws fluid from the at least one thermal reservoir via the high-temperature supply line.

8. The thermal energy storage system as claimed in claim 7 wherein the low-temperature part and/or the high-temperature part of the active thermal energy transfer means, at least at times, supplies fluid to the at least one thermal reservoir having a different temperature level than the average temperature level in the at least one thermal reservoir.

9. A heating system for providing thermal energy supply to a building wherein it comprises a heat storage system as claimed in claim 1.

10. The thermal energy storage system of claim 1, wherein thermal energy is transferred by fluid flowing between a third temperature section and at least one of the high-temperature section and the low temperature section of the thermal reservoir, the third temperature section being a section of the thermal reservoir other than the high-temperature section and the low-temperature section.

11. A method for changing the energy distribution of a thermal reservoir, comprising:
    transferring thermal energy from at least one low-temperature section of the thermal reservoir to at least one high-temperature section of the thermal reservoir;
    wherein the transfer of thermal energy at least in part and/or at times is performed by an active thermal energy transfer means connected to an outlet at a middle portion of the thermal reservoir between the at least one low-temperature section and the at least one high-temperature section; and
    wherein the outlet splits into a high-temperature supply line directly supplying fluid from the outlet of the thermal reservoir to a high-temperature part of the active thermal energy transfer means, and a low-temperature supply line directly supplying fluid from the outlet of the thermal reservoir to a low-temperature part of the active thermal energy transfer means;

wherein the low-temperature part of the at least one active thermal energy transfer means is fluidly connected to a low-temperature part return line connected to the at least one low-temperature section of the thermal reservoir and pumps fluid from the outlet of the at least one thermal reservoir to the at least one low-temperature section of the thermal reservoir;

wherein the high-temperature part of the at least one active thermal energy transfer means is fluidly connected to a high-temperature part return line connected to the at least one high-temperature section of the thermal reservoir and pumps fluid from the outlet of the at least one thermal reservoir to the at least one high-temperature section of the thermal reservoir; and wherein the at least one active thermal energy transfer means transports heat from fluid from the low temperature supply line to fluid from the high temperature supply line so that the low-temperature part of the at least one active thermal energy transfer means pumps cooled fluid to the at least one low-temperature section of the thermal reservoir, and the high-temperature part of the at least one active thermal energy transfer means pumps heated fluid to the at least one high-temperature section of the thermal reservoir.

12. The method according to claim 11, wherein at least in part and/or at least at times a thermal energy transfer is performed by fluid flow between at least one third section of the thermal reservoir and the at least one low-temperature section of the thermal reservoir and/or the at least one high-temperature section of the thermal reservoir.

13. The method according to claim 11, wherein, at least at times, no thermal energy is fluidly added to the thermal reservoir by a thermal energy source in fluid connection with the thermal reservoir aside from any thermal energy that may be added due to work done by the active thermal energy transfer means and/or no thermal energy is fluidly removed from the thermal reservoir by a thermal energy consumer in fluid connection with the thermal reservoir.

14. A thermal energy storage system comprising:
at least one thermal reservoir; and
at least one heat pump that, at least at times, transfers thermal energy from at least one low-temperature section of the thermal reservoir to at least one high-temperature section of the thermal reservoir;
wherein the at least one thermal reservoir comprises an outlet at a middle portion of the thermal reservoir between the at least one low-temperature section and the at least one high-temperature section, the outlet of the thermal reservoir splitting into a high-temperature supply line directly supplying fluid from the outlet of the at least one thermal reservoir to a high-temperature part of the at least one heat pump, and a low-temperature supply line directly supplying fluid from the outlet of the at least one thermal reservoir to a low-temperature part of the at least one heat pump;

wherein the low-temperature part of the at least one heat pump is fluidly connected to a low-temperature part return line connected to the at least one low-temperature section of the thermal reservoir and pumps fluid from the outlet of the at least one thermal reservoir to the at least one low-temperature section of the thermal reservoir;

wherein the high-temperature part of the at least one heat pump is fluidly connected to a high-temperature part return line connected to the at least one high-temperature section of the thermal reservoir and pumps fluid from the outlet of the at least one thermal reservoir to the at least one high-temperature section of the thermal reservoir; and wherein the at least one active thermal energy transfer means transports heat from fluid from the low temperature supply line to fluid from the high temperature supply line so that the low-temperature part of the at least one active thermal energy transfer means pumps cooled fluid to the at least one low-temperature section of the thermal reservoir, and the high-temperature part of the at least one active thermal energy transfer means pumps heated fluid to the at least one high-temperature section of the thermal reservoir.

15. The thermal energy storage system as claimed in claim 14, wherein thermal energy is transferred by fluid flowing between a third temperature section and at least one of the high-temperature section and the low temperature section of the thermal reservoir, the third temperature section being a section of the thermal reservoir other than the high-temperature section and the low-temperature section.

\* \* \* \* \*